United States Patent [19]

Theriot

[11] 4,004,610
[45] Jan. 25, 1977

[54] LINE CONTROL
[75] Inventor: Gerald F. Theriot, Houma, La.
[73] Assignee: B.W.B. Controls, Inc., Houma, La.
[22] Filed: Apr. 14, 1975
[21] Appl. No.: 567,715
[52] U.S. Cl. .................. 137/614.17; 137/614.18; 137/107; 137/625.68
[51] Int. Cl.² .......................... F16K 43/00
[58] Field of Search ............ 137/614.17, 614.16, 137/614.18, 513.3, 102, 107, 117, 459, 596, 596.1, 596.18, 625.66, 625.67, 625.68

[56] References Cited
UNITED STATES PATENTS

| | | | |
|---|---|---|---|
| 1,036,479 | 8/1912 | Flamm | 137/513.3 |
| 2,139,075 | 12/1938 | Gates | 137/614.17 |
| 2,610,859 | 9/1952 | Wilcox et al. | 137/102 |
| 2,619,914 | 12/1952 | Dobkin | 137/614.2 |
| 2,722,402 | 11/1955 | Crookston | 137/102 |
| 2,764,174 | 9/1956 | Wilson | 137/102 |
| 2,771,898 | 11/1956 | Rotter | 137/107 |
| 3,034,527 | 5/1962 | Hennells | 137/102 |
| 3,215,160 | 11/1965 | Rice | 137/625.68 |
| 3,255,777 | 6/1966 | Rice et al. | 137/625.68 |
| 3,482,600 | 12/1969 | Hodgson | 137/625.68 |
| 3,742,926 | 7/1973 | Kemp | 137/512.2 |
| 3,877,484 | 4/1975 | Theriot et al. | 137/625.66 |

Primary Examiner—William R. Cline
Assistant Examiner—H. Jay Spiegel
Attorney, Agent, or Firm—Robert W. B. Dickerson

[57] ABSTRACT

A valve control having a piston movable within a body, inlet outlet and bleed ports in said body, said piston having an opening therethrough with an orifice containing check valve positioned within said opening for permitting fluid to bleed from said outlet to said inlet.

2 Claims, 3 Drawing Figures

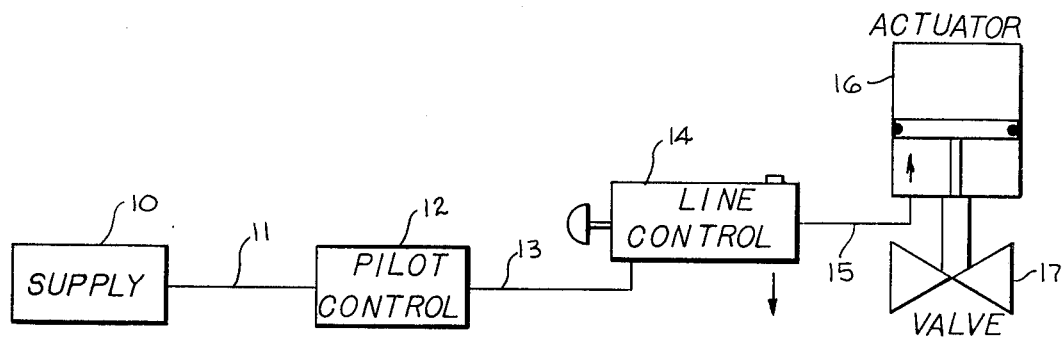
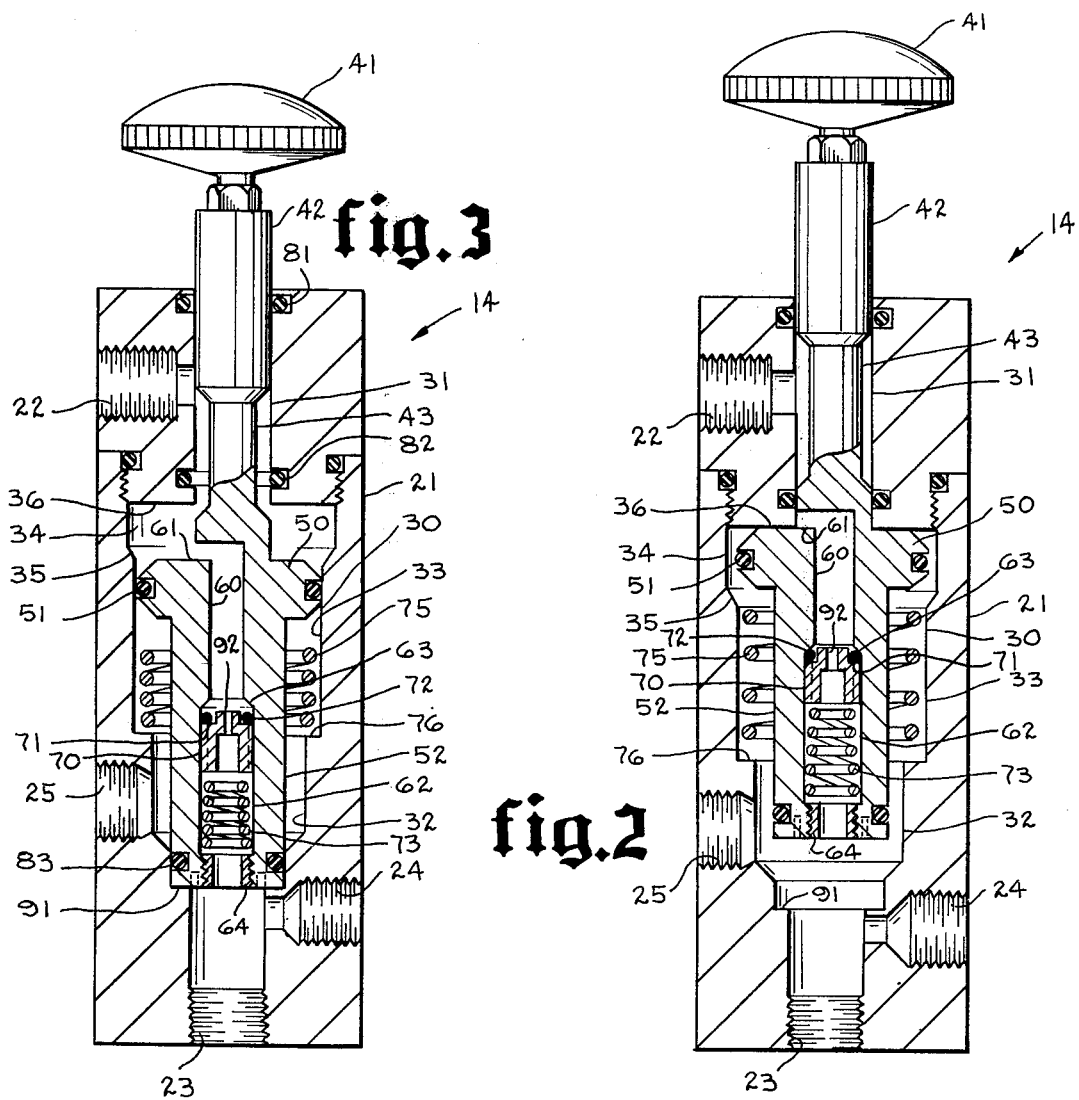

LINE CONTROL

BACKGROUND OF THE INVENTION

Control systems have long been used to cause the opening and closing of a valve. Present day systems utilize fluid-pressure-activated actuators, which cause longitudinal or oscillatory movement of a valve stem, thereby effecting such opening and closing. Such pressure, is provided by a supply source. Intermediate such source and actuator, there may be pilot-control devices, which permit the passage of such motivating fluid only when the pressure of the supply is within a discreet range. It has been deemed beneficial to provide additional controls, intermediate such supply and actuator, to permit bleeding of fluid from the actuator, in the event of valve closure. It is to the solution of the latter mentioned problem that this invention is directed.

SUMMARY OF THE INVENTION

Valve actuator supply fluid, under pressure, is provided this line control, through the intermediary of a pilot control, which is operative within a discreet pressure range. This line control, is then conduit connected to an actuator. Therefore, the line control includes an inlet, one or more outlets, and a bleed port. Internally, the line control includes a movable first piston connected to a manually activated stem. Internally of the first piston is a spring biased, orifice containing, second piston. On movement of the first piston from a first to a second position, motivating fluid may be passed to the actuator. When in said first position, it may not. The orifice-containing second piston permits bleeding of the fluid from the actuator when the valve is closed.

DESCRIPTION OF THE DRAWINGS

FIG. 1 is a schematic of the Control of this invention in relation to a source of supply pressure, valve actuator and valve to be controlled;

FIG. 2 is a vertical section through the Control, depicting in the "shut-in" position, and FIG. 3 is a section similar to FIG. 2, but with the Control in "operate" position.

DESCRIPTION OF A PREFERRED EMBODIMENT

Consider first the block diagram of FIG. 1. A source of fluid supply, gas or liquid, under pressure, is indicated at 10. It in turn is connected by conduit 11 to pilot control 12. This device, which may for example also be connected to line pressure, is open only when the observed pressure is within a discreet pressure range. When open, it operatively passes the supply pressure to the line control of this invention, number 14, via conduit 13. Member 14 is in turn linked by conduit 15 to valve actuator 16, which actuator operates to open or close valve 17.

Move now to FIGS. 2 and 3 depicting this invention, the former representing the shut in or closed position and the latter operate or open position. The line control includes a hollow body 21. At one end of the body is inlet 22, into which conduit 13, leading from the pilot control, would be connected. At the other end of the body a pair of outlets 23 and 24 are illustrated. According to the present embodiment, outlet 23 would be connected to actuator 16 by conduit 15. Outlet 24 might be plugged, or used for some peripheral function. Near said outlets is bleed port 25. Each of said inlet, oulets, and bleed port is in fluid communication with vertical bore 30 passing axially through body 21. Said bore generally includes three sections, namely upper and lower end sections 31, 32 and centrally enlarged counterbore 33, said counterbore 33 having an enlarged portion 34 connected by shoulder 35 and forming shoulder 36. Slidably disposed within bore 30 is a slide valve member. Said member includes a manually grippable member 41 fixed to one end of stem 42. Said stem includes annular reduced portion 43 extending to near the other end thereof. Connected to said other end, and slidable disposed within enlarged bore porion 33, is a first piston 50, having an annular seal 51 therearound. An elongated extention 52 extends from piston 50, opposite from stem 42. A vertical bore 60 communicates with both horizontal tap 61 and enlarged counterbore 62, to provide fluid communication interiorly through said piston and extension. An annular shoulder 63 actually links bore 60 with counterbore 62. At the lower end of extension 52, annular shoulder 64 is formed.

Within counterbore portion 62, of the slide valve member, is a movable second piston 70 having an annual taper 71 and an annular seal 72, therearound. Resiliently biasing said second piston in the direction of inlet 22 is spring 73, said spring being supported at one end by shoulder 64 and at the other end by said second piston. A further spring 75 resiliently biases piston 50 in the same direction, said further spring being supported by body shoulder 76 and piston 50. Various other annular seal members 81, 82 and 83 are provided to the body bore and slide valve member as indicated.

Consider now the operation of the device of this invention. When pressurized fluid from supply source 10 is being provided at the proper pressure through pilot control 10, it reaches inlet 22. If the line control had been in the "shut in" position of FIG. 2, ie. valve 17 closed, nothing would happen unless force, manual or otherwise, was exerted downwardly against knob 41. On this occuring, the slide valve member would be forced downwardly, as in FIG. 3, with the lower end of extension 52 seated against the shoulder 91. A fluid passageway would exist from inlet 22, through the annular area, around reduced portion 43, through horizontal tap 61, bore 60, and counterbore 62, from whence it would exit through outlet 23, pass through conduit 15 (FIG. 1) to actuator 16. There it would result in the desired function of valve 17, ie. opening it. Note that the motivating fluid pressure would retain the slide valve member in the position of FIG. 3 by exerting a force against the upper surface of piston 50, against the force of spring 75. Fluid passing into the counterbore 62 will unseat seal 72 from shoulder 63, push piston 70 downwardly, against the force of spring 73, and pass around said piston (some portion slowly passing through orifice 92). There the slide valve member will remain while in the "operate" or "open" condition.

If the pilot control 12 senses a pressure change out of its range, it will block the supply of pressurized fluid. On this occurring, a pressure drop within the system would occur, causing second piston 70, and its seal 72, to be seated against shoulder 63. Control fluid thereabove would be bled out through inlet 22. When such pressure drop occurs, spring 75 would tend to force piston 50 from the position illustrated by FIG. 3 (operate) to that of FIG. 2 (shut in). This would result in actuator 16 closing valve 17. Actuator fluid would be bled through conduit 15, outlet 23, and bleed port 25.

A further benefit of the invention should now be described. In actual field usage, manual controls, such as this, sometimes have their plunger (knob 41 and stem 42) movement blocked, either purposefully, as by tape, or accidentally, as by corrosion or other blocking means. That being true, even though pilot control pressure were removed, the slide valve member would not shift to the "shut in" position. The provision herein of orifice 92, herein, provides an added safety feature. In the event of such removal of pilot or control pressure, and if the slide valve member were stuck in the "operate" position, then actuator fluid could still bleed through orifice 92 and out inlet 22, thereby shutting in the valve 17 even though the slide valve member of the line control were inoperative.

Although only a single embodiment of this invention has been described, it should be obvious that numerous modifications would be possible by one skilled in the art without departing from the spirit of the invention, the scope of which is intended to be limited only by the following claims:

I claim:

1. A control device adapted to be positioned intermediate a source of fluid under pressure and a valve actuator, said control device including:
    a housing having an axial bore extending centrally thereof, said housing including fluid inlet means communicating with said axial bore, and fluid outlet means also communicating with said axial bore;
    slide valve means movable within said axial bore from a first position allowing relatively unrestricted fluid communication between said inlet means and said outlet means to a second position blocking such communication between said inlet means and said outlet means;
    first spring means, internal of said axial bore for biasing said slide valve means toward said second position;
    said slide valve means including first force transmitting means, extending at least partially outward of said housing, for causing movement of said slide valve means from said second position to said first position;
    said slide valve means further including means for preventing said fluid under pressure from causing movement of said slide valve from said second position to said first position, and means for retaining said slide valve means in said first position against the biasing force of said first spring means, said retaining means including a piston portion having a fluid pressure receiving surface, for receiving said fluid under pressure thereagainst, said piston being sealingly engageable with the wall of said axial bore when said slide valve means is in said first position; and
    check valve means, carried within an axial bore through a reduced diameter portion of said slide valve means, yieldably obstructing communication between said fluid inlet means and said fluid outlet means.

2. The device of claim 1 wherein said check valve means is movable from a first position within said slide valve means axial bore permitting fluid passage around said check valve means and within said slide valve means axial bore to a second position blocking such fluid passage, and said check valve means also includes orifice means for bleeding fluid from said outlet means to said inlet means only when said slide valve means is in its said first position.

* * * * *